United States Patent [19]

Van Landeghem

[11] Patent Number: 4,899,374
[45] Date of Patent: Feb. 6, 1990

[54] METHOD FOR A PROGRAM-CONTROLLED TELEPHONE SWITCHING SYSTEM IN WHICH PERFORMANCE FEATURES RELATING TO THE SETUP OF A CALL CONNECTION CAN BE INITIATED FROM A SUBSCRIBER STATION

[75] Inventor: Marc Van Landeghem, Deinze, Belgium

[73] Assignee: Siemens Aktiengesellschaft, Berlin and Munich, Fed. Rep. of Germany

[21] Appl. No.: 235,175

[22] Filed: Aug. 23, 1988

[30] Foreign Application Priority Data

Aug. 25, 1987 [DE] Fed. Rep. of Germany ....... 3728345

[51] Int. Cl.⁴ .............................................. H04M 3/48
[52] U.S. Cl. ................................... 379/215; 379/208; 379/209
[58] Field of Search ................ 379/215, 142, 208, 209

[56] References Cited

U.S. PATENT DOCUMENTS

| 3,609,245 | 9/1971 | Richter | 379/208 X |
| 4,166,929 | 9/1979 | Sheinbein | 379/209 X |

FOREIGN PATENT DOCUMENTS

| 0154862 | 9/1984 | Japan | 379/209 |
| 0148266 | 8/1985 | Japan | 379/209 |

Primary Examiner—James L. Dwyer
Attorney, Agent, or Firm—Hill, Van Santen, Steadman & Simpson

[57] ABSTRACT

A method for automatically connecting an indicating telephone conditions in which when a subscriber calls another subscriber and when the called subscriber's phone is busy, a central controller which includes a memory automatically is subsequently connected after waiting tones and signal tones and cut-in tones have been generated. The method allows automatic connections and cut-ins without redialing by the calling station.

3 Claims, 2 Drawing Sheets

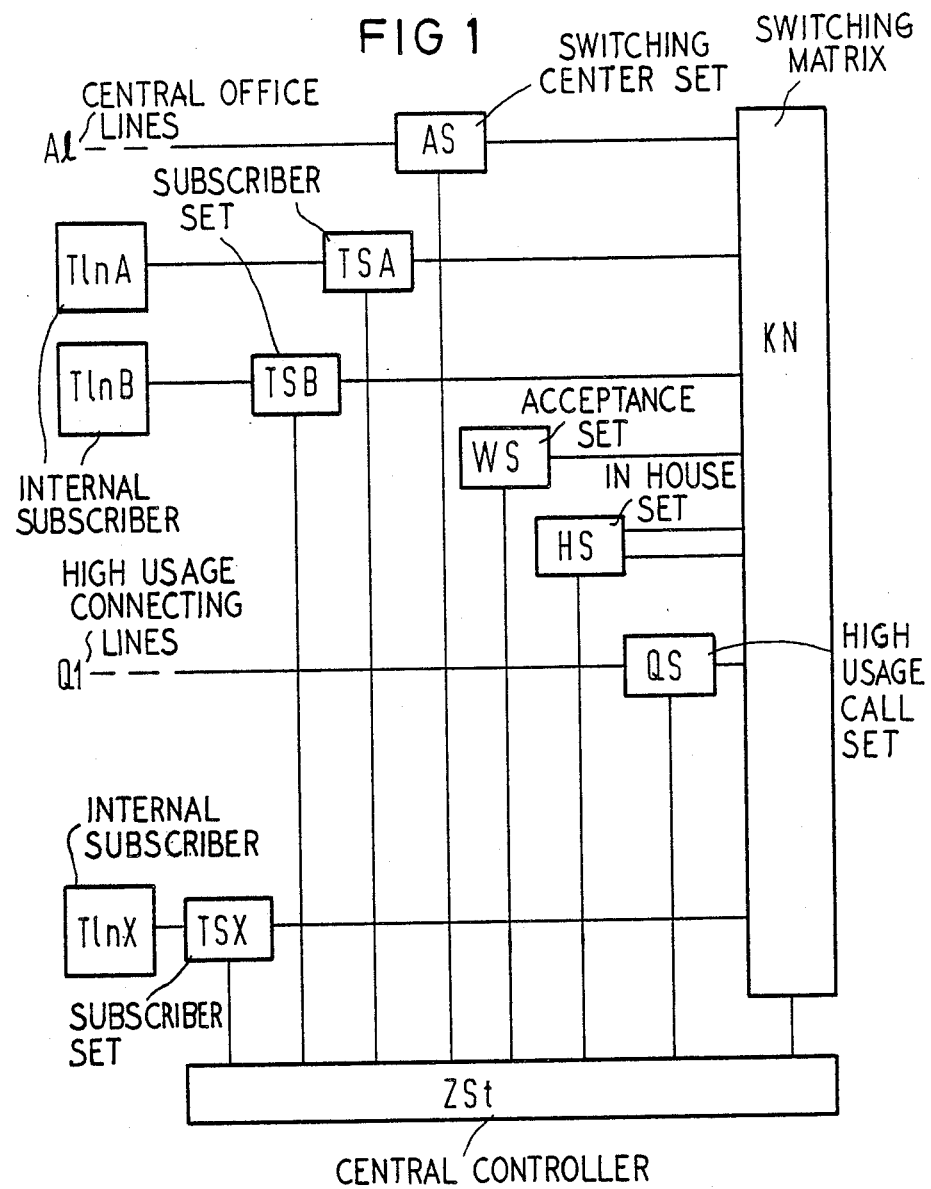

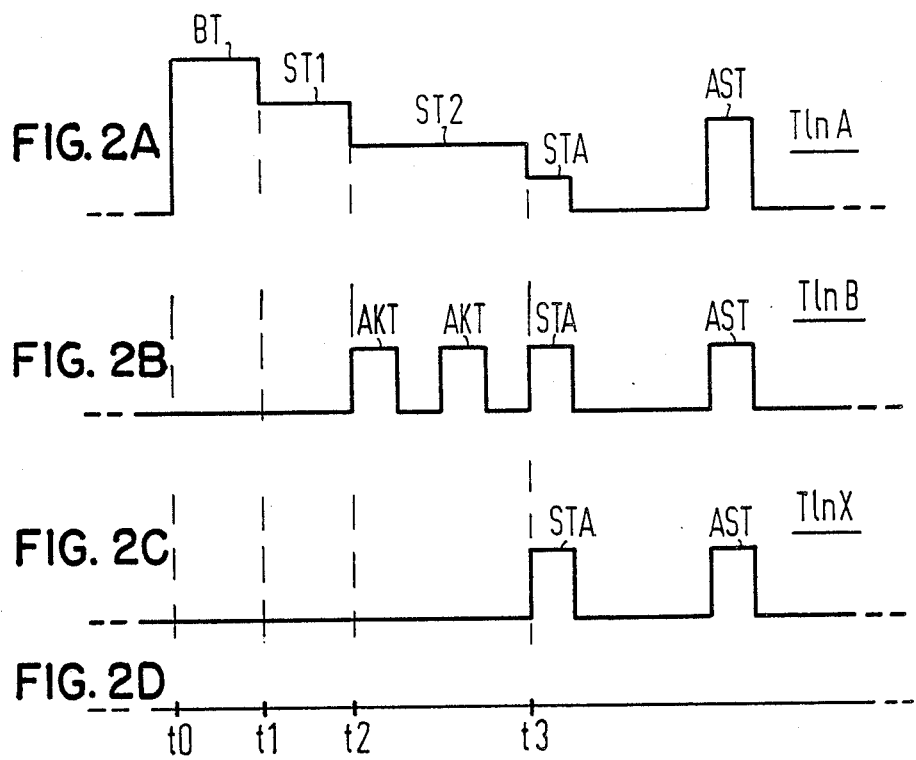

METHOD FOR A PROGRAM-CONTROLLED TELEPHONE SWITCHING SYSTEM IN WHICH PERFORMANCE FEATURES RELATING TO THE SETUP OF A CALL CONNECTION CAN BE INITIATED FROM A SUBSCRIBER STATION

BACKGROUND OF THE INVENTION

1. Field of the Invention

This invention relates in general to a method for programmed-controlled telephone switching wherein a central controller that includes a memory executes all of the switching functions and its memory includes all information required for the execution of the switching functions which have been stored and specific performance features relating to the setup of call connection can be automatically initiated by a subscriber station.

2. Description of the Prior Art

In present day telephone switching systems, a telephone subscriber can use various performance features which are available at his subscriber station. For example, performance features such as dial repetition, abbreviated dialing, call rerouting and connecting for conference calls are available, for example. Such performance features can be initiated either initially when the switching equipment is utilized or also during a call connection which already exist. It is known to initiate performance features by dialing specific numbers such as numerical sequences. This is complicated for the user and there is the risk of incorrect inputs. Another possibility of activating performance features is possible using function keys. In the prior art systems, specific decisions are required by an individual user for the specific possible connections. For example, when the called subscriber station is busy, the calling subscriber can initiate a number of performance features as, for example, automatic call-back, call-waiting, break in or dial repetition or, respectively a message exchange via "voice mailboxes" in the most modern systems.

When the subscriber decides to utilize one of these performance features, then he has no possibility of modifying the earlier selected performance features without the initiation of a new command and such initiation can be fairly complicated. For many subscribers, it is also considered inconvenient to dial additional numbers or to actuate specific functions keys when setting up a call connection which is usually carried out while performing some other activity.

SUMMARY OF THE INVENTION

It is an object of the present invention to simplify the performance of the performance features for a calling a subscriber when the subscriber being called is busy particularly when the calling subscribers positively desires a connection to the call subscriber within a specific time limit.

In the method of the invention when the call subscriber station is busy, higher priority performance features, for example, call-back when not busy, call-waiting, break in and so forth are automatically initiated in succession after prescribed time intervals.

In the method of the invention, when a subscriber encounters a busy subscriber station then no further activities are required by the subscriber making the call and rather after specific defined time intervals performance features having respectively higher priority are automatically activated so that a connection between the calling and the call subscriber station occurs in any event. The calling subscriber of the calling subscriber station thus has the possibility of preventing the ultimate possibility of the call connection at any time.

An expedient development of the method of the invention is that the performance feature that is respectively automatically initiated, is acoustically and/or optically signalled at the calling subscriber station. The result is that the user has knowledge in a simple manner about the respective stages of the initiation of the various performance features at all times.

Another expedient development of the method of the invention is that when the called subscriber station is busy, a call back order is automatically entered with a connection of the busy signal and this call back order is executed within a first prescribed time span after the call subscriber station becomes free. When the call subscriber station is busy, the entry of the call back order automatically occurs without the calling subscriber taking any action. This prevents the called subscriber from ending his call and leaving the subscriber station before the calling subscriber has entered a call back order and, thus, prevents the creation of a call connection between the two subscribers. Immediately after the end of his call, the called subscriber is thus notified that there is a call request so that he does not leave the subscriber station.

Another development of the method of the invention is that a call back order is automatically entered by hanging up the handset at the calling subscriber station which is entered within a second prescribed time span following the first time span. The calling subscriber will select this possibility when he does not give such a high priority to the desired call that he would like to have a call-waiting or, respectively, break-in carried out.

A further development of the method of the invention is that in the absence of a call back order, a call-waiting tone is automatically transmitted to the called subscriber during a third prescribed time interval which automatically follows the second time interval and that a connection of the calling subscriber automatically occurs after the expiration of the third time period when the call connection does not previously occur. This assures that in case the subscriber has not decided in favor of a normal call-back that a call connection between the calling and the called busy subscriber station automatically occurs in any case.

Other objects, features and advantages of the invention will be readily apparent from the following description for certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a block diagram illustrating a program-controlled telephone switching system according to the method of the invention; and FIGS. 2A-2D illustrate the chronological execution of the individual performance features of the invention including adjacent call progress tones.

DESCRIPTION OF THE PREFERRED EMBODIMENTS

FIG. 1 is a block circuit diagram which illustrates the essential components of a telephone switching system. The exchange-oriented control executions are substantially controlled by the central controller ZSt which also includes extensive memories. The central controller ZSt is connected to a switching matrix network KN and also to a plurality of connector sets. It is assumed in the present case that the illustrated telephone switching equipment is a private branch exchange. It should be realized of course that in this context that the method of the invention is not limited to a private branch exchange.

Of the many possible connector sets, a switching center set AS by way of which the connection to the public telephone switching centers occurs through a central office lines Al, an in-house set HS by way of the internal connections are switched, and an acceptance set WS for the acceptance of dial information transmitted in the multi-frequency method, and a high usage call set QS by way of which the connection to parallel private branch exchanges is sequenced by way of high usage connecting lines Q1 are illustrated. For example, the internal subscribers TlnA through TlnX are each connected to the illustrated telephone switching center by way of the subscriber sets TSA through TSX. In a manner not shown, such subscriber sets contain indication locations that recognize status changes on the respective connecting lines. The individual information of the subscriber sets or, respectively, the connector sets are accepted by the central controller ZSt. The central controller ZSt then communicates setting instructions to the individual sets. This is true of both the subscriber sets as well as the connector sets. The respective connector set or, respectively, subscriber set is thus identified with address information. It is assumed that a person skilled in the art to which the present invention pertains are familiar with the structure of a telephone switching system and details of the illustrated telephone switching system are not given for this reason.

FIGS. 2A-2D illustrates various signals which occur during different time periods and it is assumed in the diagrams illustrated in FIG. 2 that the subscriber station TlnA is the calling subscriber station and the subscriber station TlnB is the called subscriber station which is busy when called and that the subscriber station TlnB is in a call condition with the subscriber station TnlX.

At time to, the subscriber station A makes a call to subscriber station B which is in the busy condition. In response, the subscriber station A receives a busy signal until the time T1. During this time, the calling subscriber has the possibility of entirely foregoing connecting to the subscriber station B. That is achieved by merely hanging up the handset by the subscriber A or, respectively, assuming a handfree station by depressing an appropriate key. According to the invention a call-back order is automatically entered at time t0 and this order is executed after the called subscriber becomes free by time t1. It is thus prevented that the call subscriber after ending his call leaves the subscriber station before he calling subscriber has input a call-back order. This automatically entered call-back order does not occur when the calling subscriber hangs up the handset or, respectively, actuates an appropriate key during the first time interval from t+0 through t1. During the interval after time t1 through t2, the calling subscriber receives a signal tone ST1 of a first time that tells him that a call-back order has been automatically entered during this time interval when he hangs up the handset. When the desired subscriber station B is free, the subscriber station A that automatically entered the call-back order by hanging up the handset is called back.

After accepting such call-back, the desired subscriber station B is called.

When the calling subscriber undertakes no activity before the time t2, then the subscriber station B is notified of an urgent call by waiting tone signal AKT and this is carried out automatically after the time t2. If in the meantime, the desired subscriber of subscriber station B ends this call, he is automatically called. During this time interval, the subscriber of the calling subscriber station has the possibility of foregoing an ultimate call setup in other words, of foregoing the performance feature of "call waiting" again by hanging up the handset.

When the subscriber of the calling subscriber station A takes no activity before time t3, after encountering the situation where the subscriber station B is busy, then the subscriber station A is connected into the connection between the subscriber station B and the subscriber station X at the time t3 (break-in). Upon this connection being made, a signal tone STA is transmitted and all three subscriber stations A, B and X are interconnected in a conference call. During the cut-end connection, a cut-in tone AST is provided at defined time intervals so as to provide an attention signal. It should be noted that the cut-in is not possible for extensions which are protected against cut-in and for terminals having data protection and can only be executed at other subscriber stations that have no such protection when the calling subscriber station has an appropriate authorization.

It is seen that the present invention allows a person to make a call to another station and when such station is busy, the central controller automatically initiates various functions and sequences which ultimately connect the two or more stations.

Although the invention has been described with respect to preferred embodiments, it is not to be so limited as changes and modifications can be made which are within the full intended scope of the invention as defined by the appended claims.

I claim as my invention

1. A method for a program-controlled telephone switching system which comprises a central controller which executes all switching functions, and said central controller has a memory in which all the information required for the execution of the switching functions are stored and where specific performance features relating to the set-up of a call connection are respectively initiatable by a subscriber station, comprising the steps of calling subscriber station calling a called subscriber station, and when the called subscriber station (T1nB) is busy, automatically initiating higher-priority performance features call-back when not busy, call waiting and cut-in in succession after prescribed timed intervals until the desired connection occurs.

2. A method according to claim 1, wherein after said automatically initiating step, acoustically and/or optically signalling occurs at the calling subscriber station.

3. A method for a program-controlled telephone switching system which comprises a central controller which executes all switching functions, and said central controller has a memory in which all the information required for the execution of the switching functions are stored and where specific performance features relating to the set-up of a call connection are respectively initiatable by a subscriber station, comprising the steps of calling subscriber station calling a called subscriber station, and when the called subscriber station (T1nB) is busy, automatically initiating higher-priority performance features call-back when not busy, call waiting and cut-in in succession after prescribed timed intervals until the desired connection occurs, wherein when the called subscriber station is busy, automatically entering a call-back order with the connection of the busy signal, and the call-back order being executed within a first prescribed time interval after the called subscriber station becomes free, wherein said call-back order is automatically entered by hanging up the handset at the calling subscriber station, and it is automatically entered within a second time interval following said first prescribed time interval, and wherein the absence of a call-back order, automatically transmitting a call waiting tone to the called subscriber station during a third prescribed time interval that follows said second prescribed time interval and automatically cutting in the calling subscriber station when the call connection is not set up after the expiration of the third, prescribed time interval.

* * * * *